Oct. 21, 1952   H. M. OGLE   2,615,155
VOLTAGE REGULATOR
Filed May 2, 1950

Inventor:
Hugh M. Ogle,
by
His Attorney.

Patented Oct. 21, 1952

2,615,155

UNITED STATES PATENT OFFICE 2,615,155

VOLTAGE REGULATOR

Hugh M. Ogle, Schenectady, N. Y., assignor to General Electric Company, a corporation of New York Application May 2, 1950, Serial No. 159,545

10 Claims. (Cl. 322—28)

This invention relates to voltage regulators, more particularly to static voltage regulators for alternating current generators, and has for its general object the provision of an improved apparatus of this type.

A more specific object of the invention is to provide a simple and reliable voltage regulator which has no moving parts and uses no vacuum tubes or other electron discharge devices.

Another object of my invention is to provide a voltage regulator for an alternating current generator which is not adversely affected by variations in frequency of the generator being regulated.

A further object of the invention is the provision of a voltage regulator which will maintain the voltage of the generator being regulated within very close limits.

A still further object of the invention is to provide a regulator for an alternating current generator which does not require a supply of unidirectional reference current, either from an external source or derived from the alternating current.

Other objects and advantages of my invention will be apparent from the subsequent detailed description, while the features of novelty which characterize the invention are pointed out in the appended claims.

In carrying out my invention in one form, I provide a magnetic regulating and amplifying device which utilizes a permanent magnet as a reference. This device is connected to be energized by the voltage of the alternating current generator which is to be regulated. The output current of this device which varies inversely with variations in the generator voltage is further amplified by a second magnetic amplifier stage. The output of the latter is utilized to energize the field winding of the generator, and this output varies automatically to maintain the generator voltage substantially constant. The apparatus also includes a phase shifting circuit, used to energize bias windings on both amplifier stages, which is important in providing close regulation.

Figure 1:
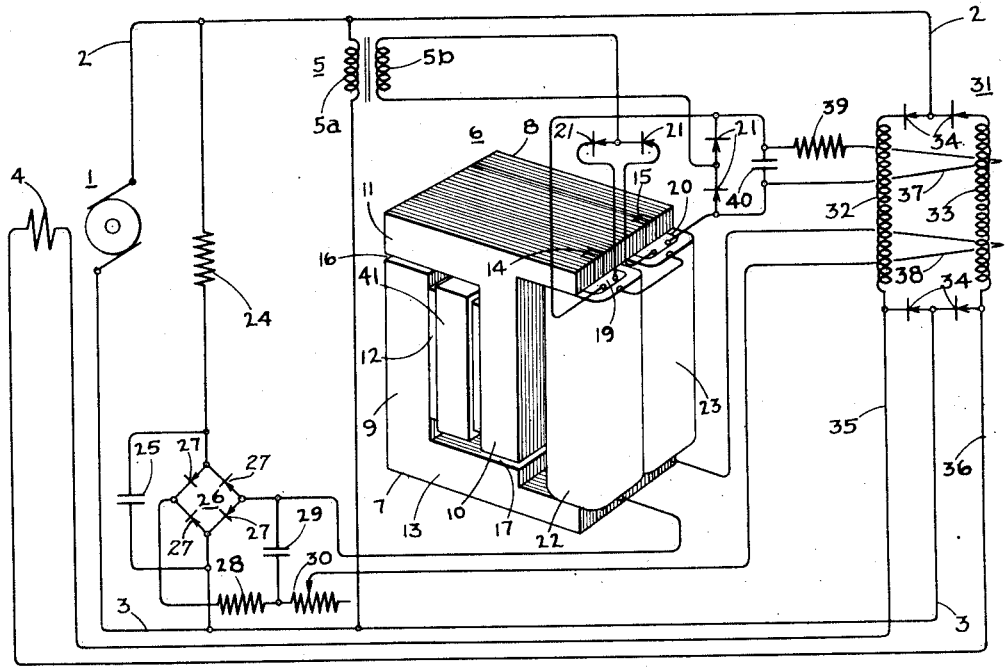
Figure 2:
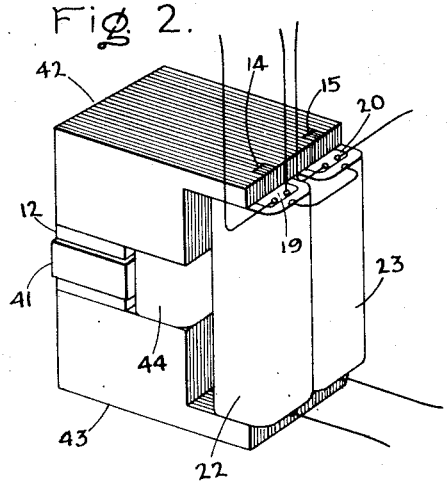
Figure 3:
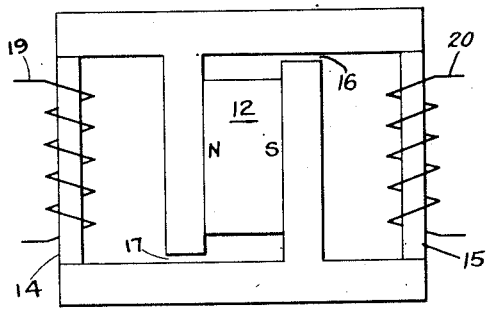

For a clearer and more complete understanding of the invention, reference should be had to the accompanying drawing in which Fig. 1 is a schematic diagram of a preferred embodiment of the invention, while Figs. 2 and 3 illustrate alternative arrangements which may be used for the structure of the magnetic regulating and amplifying device.

Referring to Fig. 1 of the drawing, an alternating current generator whose voltage is to be regulated is designated by the numeral 1. This generator is illustrated as a single phase machine having two output terminals through which lines 2 and 3 are energized, but it will be readily understood that my invention is adaptable for regulating the voltage of an alternating current generator having any number of phases. The generator 1 has a field winding 4 to provide excitation for the generator.

A transformer 5 is connected to be energized by the output voltage of generator 1, the primary winding 5a of the transformer being connected between lines 2 and 3. The secondary winding 5b of the transformer supplies energy to a magnetic regulating and amplifying device 6.

The device 6 comprises a main magnetizable core composed of two members 7 and 8 in slightly spaced apart relation. These members may be made from flat stacked laminations of ordinary sheet or strip magnetic material such, for example, as hot or cold rolled silicon steel. The member 7 is generally L-shaped, having an arm 9 and another arm 13 at right angles thereto. The member 8 is generally T-shaped having a center portion 10 and a cross member 11. The main magnetic circuit of the device is completed by two different kinds of magnetic members which close or bridge what otherwise would be openings in the main magnetic circuit. Thus, a permanent magnet 12 is inserted in the opening between the portions 9 and 10 of the core with one pole thereof adjacent member 9 and the other pole thereof adjacent member 10. This permanent magnet is preferably an Alnico (aluminum-nickel-cobalt alloy) magnet which is characterized by especially high retentivity and coercive force. Some forms of its composition are the subject matter of Mishima Patents 2,027,994 to 2,028,000, inclusive. Extending between the projecting ends of the portions 11 and 13 of the core there are disposed in parallel spaced relation a pair of laminated core leg members 14 and 15, which thus bridge the gap between the ends of members 11 and 13. These legs 14 and 15 are of relatively small cross section in comparison with the cross section of the rest of the core, and they are made of a magnetic material which has a very abrupt bend or sharp knee in its magnetization or saturation characteristic. A suitable magnetic material having such properties is known generally as nicaloi, which consists of approximately equal portions of nickel and iron.

The device 6 is so proportioned that the legs 14 and 15 are saturated by a small portion of the total flux of the permanent magnet 12. The rest of the flux of the permanent magnet 12 by-passes the legs 14 and 15 through a pair of parallel related gaps 16 and 17 which are formed by members 7 and 8 so as to be in shunt relation to magnet 12. Thus, gap 16 is formed between the adjacent ends of the portions 9 and 11, and gap 17 is formed between the end of portion 10 and the center of the portion 13. The magnetic cross section of the main part of the core is sufficiently large that it is not saturated.

Mounted respectively on the legs 14 and 15 of device 6 are a pair of main windings 19 and 20. These windings are connected in a bridge type circuit with four rectifier devices 21, which are preferably of the dry type, so that unidirectional current flows through windings 19 and 20. Windings 19 and 20 are connected with like polarities and they are arranged on their respective core legs so that the flux produced by windings 19 and 20 is in the same direction as the unidirectional flux from the permanent magnet, that is, the magnetomotive forces of these windings and the magnetomotive force of the permanent magnet are additive in these core legs. By reason of the magnetic paths through the gaps 16 and 17 which are in shunt with the legs 14 and 15, the main windings 19 and 20 have negligible coupling or mutual inductance, and the flux in each one is substantially independent of the other.

A pair of biasing and compensating control windings 22 and 23 are mounted respectively on core legs 14 and 15, preferably concentric with and outside, the main load windings 19 and 20. These windings are serially connected in a manner such that they are the equivalent of a single control winding around both the legs 14 and 15. These windings produce a magnetizing effect in core legs 14 and 15 in the opposite direction to that produced by permanent magnet 12, the magnetizing effect of the compensating windings being always less than that of the permanent magnet. Thus, winding legs 14 and 15 are partially saturated to a degree dependent upon the difference between the magnetizing effects of the permanent magnet and the biasing windings.

Windings 22 and 23 are supplied with unidirectional current from a phase shifting and biasing circuit which includes a resistor 24 connected in series with a capacitor 25 across lines 2 and 3. A conventional bridge-type full wave rectifier 26 composed of four unidirectional conducting devices 27 is connected in shunt with capacitor 25. The unidirectional current output of rectifier 26 after passing through a filter composed of a resistor 28 and a capacitor 29 is utilized to energize control windings 22 and 23. A variable resistor 30 is also connected in this circuit for adjusting the magnitude of the current.

Device 6 acts simultaneously as a regulating device and as a self-saturating magnetic amplifier. When an alternating potential is impressed upon load windings 19 and 20 from secondary winding 5b of the transformer 5, fluxes are produced in core legs 14 and 15 which saturate these two core legs during alternate half-cycles. The point during each half-cycle at which each core leg saturates is dependent upon the pre-saturation produced by the difference between the magnetomotive force due to permanent magnet 12 and that due to control windings 22 and 23. During that portion of a positive half-cycle when the flux is increasing in one of the core legs, and before the saturation point of that core leg is reached, substantially all of the voltage drop between the two secondary conductors of the transformer occurs across the main winding 19, or winding 20, as the case may be. As soon as the saturation point is reached, however, the current which is delivered in the output circuit of the device 6 is limited only by the air core inductance of load winding 19 or 20 and the impedance of the output circuit. The core leg now being saturated, there is no longer any change in flux linkages to impede the flow of current through the load winding. Therefore, the presence of the core leg no longer affects the reactance of the load windings. When the voltage returns to zero following a positive half-cycle, the rectifiers 21 in circuit with the main load windings stop the flow of current through the winding which has been conducting and during the next half-cycle of voltage no current flows through it. During the next half-cycle the load winding on the other core leg of the device 6 repeats the operation just described so that current flows alternately through the load windings during a portion of each half-cycle of the alternating voltage wave.

Since magnetizable material having a magnetization curve with a very sharp knee is used for winding legs 14 and 15 the load current rises from a negligible value to a maximum in approximately five electrical degrees of the alternating voltage cycle when the saturating point of a winding leg is reached. For the remainder of each half cycle after saturation the load current follows approximately a sine wave. Thus, device 6 acts as a self-saturating magnetic amplifier. The output current characteristics of device 6 are very similar to those of a thyratron type electron discharge device.

In order to minimize the effect of the pulsating current through the main windings 19 and 20 on the permanent magnet 12, this permanent magnet may be provided with a low resistance short-circuited turn 41 around it. This acts to resist any change in flux in the permanent magnet.

In order to amplify the output of device 6 a second magnetic amplifier stage is provided which is shown schematically at 31. Magnetic amplifier 31 is of the self-saturating bridge-type and comprises a suitable saturable core (not shown) and a pair of load windings 32 and 33 thereon connected between the lines 2 and 3 in parallel circuit relation. Connected in circuit with each load winding is a pair of rectifier devices 34 which provide for the flow of unidirectional current alternately through the two load windings. The unidirectional output current of amplifier 31 is utilized to energize field winding 4 of the generator, the field winding being connected to the magnetic amplifier 31 by means of a pair of conductors 35 and 36.

Magnetic amplifier 31 is provided with two control or pre-saturating windings 37 and 38. Winding 37 is connected in the output circuit of device 6, and this circuit also includes a filter composed of a resistor 39 and a capacitor 40. Winding 38 is connected in series with windings 22 and 23 of device 6 to be energized by the phase shifting circuit previously mentioned. Windings 37 and 38 are connected with opposite polarities and winding 37 is connected so that the magnetomotive force which it produces adds to that produced by load windings 32 and 33 during the portion of alternate half-cycles when each is conducting. The magnetomotive force of winding 37 is always greater than that of winding 38 so that an increase in current through winding 37 results in a net increase in pre-saturating flux for magnetic amplifier 31, thereby increasing the output current which flows through excitation winding 4. Conversely, a decrease in the current in winding 37 results in decrease in the current through excitation field winding 4. A change in the current through winding 38 produces an inverse change in the load current of amplifier 31 since this winding opposes winding 37, a decrease in current in winding 38 causing an increase in the load current, and an increase in current in winding 38 causing a decrease in the load current.

In order to understand the operation of the voltage regulator circuit shown on the drawing, assume that the generator 1 has been operating with a constant output voltage and that the voltage suddenly decreases. This reduces the potential drop across the combination of resistor 24 and capacitor 25, and the potential drop across the latter reduces the unidirectional current output of rectifier 26. This reduces the average current flowing in control windings 22 and 23 of magnetic device 6, which increases the saturating flux in core legs 14 and 15 inasmuch as windings 22 and 23 oppose the magnetomotive force resulting from permanent magnet 12. The increase in flux in core legs 14 and 15 causes these core legs to saturate earlier in each voltage half-cycle, and this increases the average current output of load windings 19 and 20 even though the secondary voltage of transformer 5 also decreases. This increases the current through control winding 37 on magnetic amplifier 31. As described subsequently, the saturating effect of winding 37, as modified by opposing winding 38, causes the output of magnetic amplifier 31 to change in the proper direction to restore the output voltage of generator 1 to the desired regulated value.

It will be readily understood that the current output of rectifier 26 is pulsating even though it is unidirectional. The output current wave of this rectifier contains a ripple, the magnitude of which is determined by the relative impedances of resistor 28 and capacitor 29 which make up the filter for this circuit. In most instances such a ripple is undesirable, but in this case it is used to increase the sensitivity of the voltage regulating system. This results from the fact that the phase shifting network comprising resistor 24 and capacitor 25 causes the phase of the pulsating unidirectional output of the rectifier 26 to be shifted with respect to the voltage wave which is applied to load windings 19 and 20 from transformer 5. This shift in phase affects the pre-saturation of winding legs 14 and 15 and thus affects the point during each voltage half-cycle at which magnetic device 6 fires, with the result that a smaller change in current is required through windings 22 and 23 to achieve a given change in output current of device 6 than would be the case if the phase shifting circuit were omitted and rectifier 26 were connected directly between conductors 2 and 3.

The unidirectional output current from rectifier 26 is also applied to winding 38 of magnetic amplifier 31. This is done principally to provide a magnetic bias to insure that amplifier 31 operates at the point of optimum gain. However, the effects of the phase shifting characteristics of this circuit on magnetic amplifier 31 also aid in regulation. This occurs for similar reasons and in a similar manner to that described for device 6, the shift in phase of the pulsating unidirectional output of rectifier 26 changing the point during each half-cycle at which magnetic amplifier 31 fires, thus aiding in decreasing the current output from magnetic amplifier 31 when the potential between conductors 2 and 3 increases and increasing the current output when this potential decreases. As mentioned previously, the magnetomotive forces of windings 37 and 38 on amplifier 31 are in opposition, with that of 37 always larger than 38. Therefore, when the current through winding 37 increases as a result of a decrease in potential between windings 2 and 3, the total pre-saturating flux in magnetic amplifier 31 is increased thereby increasing the current output of the amplifier which flows through conductors 35 and 36 to field winding 4 of the generator. A decrease in potential between lines 2 and 3 therefore results in an increase in the current in field winding 4 thereby increasing the output voltage of the generator and restoring it to the predetermined regulated value.

I have found that the use of the phase shifting network comprising resistor 24 and capacitor 25, together with rectifier 26, provides voltage regulation which is appreciably better than when this network is omitted. For example, in a typical regulator embodying my invention, I have found that the percentage regulation when the phase shifting network is utilized is approximately one-tenth as great as when this network is not used and rectifier 26 is connected directly between lines 2 and 3.

A feature of my invention when used in a voltage regulator circuit as illustrated in Fig. 1 is its frequency compensation characteristics. If the frequency of generator 1 increases, for example, either concurrently with the generator output voltage or separately, the capacitive reactance of capacitor 25 is reduced, which decreases the amount of phase shift imparted to the output current of rectifier 26, thus advancing the time relationship of the pulsating flux component in the magnetic amplifiers due to windings 22 and 23 in device 6 and winding 38 in device 31. In addition, the reduction in reactance of capacitor 18 reduces the voltage drop across capacitor 25 and thereby reduces the amount of current which flows in the biasing circuit from rectifier 26. This increases the pre-saturating flux produced in the two amplifier stages. Simultaneously, however, the increase in generator frequency increases the inductive reactance of load windings 19 and 20 of device 6 and load windings 32 and 33 of device 31 which retards the time relationship of the pulsating flux component produced in the magnetic amplifiers by these windings and tends to decrease the current through the load windings. The increase in flux and the shift in phase thereof due to the change in current in the phase shifting circuit tends to compensate for the decrease in flux and shift in phase thereof due to the change in load current. By properly proportioning the reactances of capacitor 25 and the load windings on the magnetic amplifier devices, the voltage regulator can be made to compensate substantially completely for normal frequency variations of an alternating current generator, normal frequency variations in this case being considered as falling within a range of approximately 15% above to 15% below the rated frequency.

In accordance with the foregoing description, it will be apparent that my invention provides an improved static voltage regulator for alternating current generators which is not affected by normal variations of frequency, which will maintain the voltage of the generator being regulated within close limits and which does not require a supply of unidirectional reference current either separate from the alternating current system or derived from it.

It will be readily apparent to those skilled in the art that the present invention is not limited to the structure shown in Fig. 1 of the drawing for device 6. Other structural arrangements providing the same or similar magnetic properties may be used with equal facility. Two such alternative structural arrangements are illustrated in Figs. 2 and 3 of the drawing, Fig. 2 being a perspective view of one alternative, while Fig. 3 is a schematic view of another alternative. In both Figs. 2 and 3, like parts are designated by the same numerals as in Fig. 1.

In the structure shown in Fig. 2, the axis of the permanent magnet 12 is parallel to the winding legs 14 and 15 and the main portion of the core comprises similar upper and lower members 42 and 43. A magnetic shunt member 44 is inserted between the members 42 and 43 and preferably air gaps are provided in this magnetic shunt path. The main windings 19 and 20 and the biasing windings 22 and 23 are the same as in Fig. 1.

Fig. 3 shows another arrangement for device 6 which is in general similar to Fig. 1 except that the core is made symmetrical by placing the winding legs 14 and 15 on opposite sides of the portion of the core which contains the permanent magnet 12. The biasing windings have been omitted from Fig. 3 for the sake of simplicity.

It will be further understood by those skilled in the art that the second amplifier stage comprising device 31 may be eliminated completely from the regulator circuit in some cases, and the output of device 6 connected directly to provide excitation for generator 1. This arrangement may be used when the additional amplification provided by the second amplifier stage is not required.

While I have illustrated and described certain preferred embodiments of my invention, modifications thereof may be made by those skilled in the art, and it should therefore be understood that I intend to cover by the appended claims any such modifications as fall within the true spirit and scope of my invention.

What I claim as new and desire to secure by Letters Patent of the United States is:

1. A voltage regulating apparatus for an alternating current generator having an excitation field winding, comprising a magnetic reference device for deriving a unidirectional current inversely responsive to the output voltage of said generator, said magnetic reference device including a core member having a magnetizable portion and a permanent magnet portion for partially saturating said magnetizable portion, a control winding positioned on said magnetizable portion in flux opposition to said permanent magnet, a plurality of load windings positioned on said magnetizable portion, and a plurality of rectifiers in circuit with said load windings, a magnetic amplifier device for producing an amplified unidirectional current responsive to the output current of said magnetic reference device, circuit means connecting the output of said amplifier device to said field winding for the energization thereof, rectifier means for deriving a unidirectional current responsive to the output voltage of said generator, circuit means for passing said current through the control winding on said magnetic reference device, and a phase shifting network comprising a resistor in series with said rectifier means and a capacitor in shunt therewith.

2. A voltage regulating apparatus for an alternating current generator comprising a magnetizable core having a winding leg, a permanent magnet for partially saturating said leg, a load winding on said leg connected for energization by an alternating potential having a phase relation corresponding to the output voltage of said generator, a control winding positioned on said leg in flux opposition to said permanent magnet, rectifier means for energizing said control winding with a pulsating unidirectional current derived from the alternating potential output of said generator, phase shifting means interposed between said generator and said rectifier means, and additional rectifier means in circuit with said load winding whereby the current which flows through said load winding is unidirectional, said load winding supplying unidirectional current for affecting the excitation of said generator.

3. A voltage regulating apparatus for an alternating current generator having at least two output voltage terminals and an excitation field winding comprising a magnetizable core having a winding leg, a permanent magnet for partially saturating said leg, a load winding on said leg connected for energization by an alternating potential derived from the output voltage of said generator, a control winding positioned on said leg in flux opposition to the flux produced therein by said permanent magnet, rectifier means for energizing said control winding with a pulsating unidirectional current derived from the alternating potential of said generator, a phase shifting network interposed between said generator and said rectifier means, additional rectifier means in circuit with said load winding whereby the current which flows through said load winding is unidirectional, means for amplifying the unidirectional current output of said load winding, and circuit means for connecting said excitation field winding for energization by the output current of said amplifying means.

4. A voltage regulating apparatus for an alternating current generator comprising a magnetizable core having a winding leg, a permanent magnet for partially saturating said leg, a load winding on said leg connected for energization by an alternating potential derived from the output voltage of said generator, a control winding positioned on said leg in a manner such that the magnetomotive force thereof opposes the magnetomotive force of said permanent magnet, rectifier means for energizing said control winding with a pulsating unidirectional current derived from the alternating potential output of said generator, a phase shifting network interposed between said generator and said rectifier means, additional rectifier means in circuit with said load winding whereby the current flowing through said load winding is unidirectional, the current in said load winding saturating said winding leg during positive half cycles of said alternating potential, the point during such half cycles when saturation occurs varying responsively to the current in said control winding whereby the magnitude of the current through said load winding is varied, said load winding supplying unidirectional current for the excitation of said generator.

5. A voltage regulating apparatus for an alternating current generator comprising a magnetizable core having a pair of winding legs, a permanent magnet for partially saturating said legs, a pair of load windings positioned respectively on said legs and connected for energization by an alternating potential derived from the output voltage of said generator and having a phase relation corresponding thereto, control winding means positioned on said legs in flux opposition to said permanent magnet, rectifier means for energizing said control winding means with a pulsating unidirectional current derived from the alternating potential output of said generator, phase shifting means interposed between said generator and said rectifier means, a plurality of rectifier devices connected in circuit with said load windings in a manner such that unidirectional current flows respectively through said load windings during alternate half cycles of said alternating potential, said winding legs saturating respectively during alternate half cycles when the load winding on each is conducting, said control winding means varying the point during each half cycle when each winding leg saturates by varying the degree of presaturation of the winding legs, whereby the magnitude of the average current through said load windings is controlled, the excitation field winding of said generator being connected in circuit with said load windings whereby the excitation of said generator is varied to maintain a predetermined alternating voltage output from said generator.

6. A voltage regulating apparatus for an alternating current generator, said voltage regulating apparatus having a magnetic regulating device comprising a magnetizable core of relatively large cross section, a winding leg of relatively small cross section, a permanent magnet for partially saturating said winding leg, a load winding positioned on said leg and connected for energization by an alternating potential derived from the output voltage of said generator and having a phase relation corresponding thereto, and a control winding positioned on said leg in flux opposition to said permanent magnet, rectifier means for energizing said control winding with a pulsating unidirectional current derived from the alternating potential output of said generator, phase shifting means interposed between said generator and said rectifier means, additional rectifier means connected in circuit with said load winding in a manner such that unidirectional current flows through said load winding during positive half cycles of said alternating potential, said winding leg saturating during the half cycles when the load winding is conducting, said control winding varying the point during each such half cycle when said winding leg saturates by varying the degree of pre-saturation of the winding leg whereby the magnitude of the average current through said load winding is controlled, the excitation field winding of said generator being connected in circuit with said load winding whereby the excitation of said generator is varied to maintain a predetermined alternating voltage output from said generator.

7. A voltage regulating apparatus for an alternating current generator comprising a magnetic regulating and amplifying device having a pair of magnetizable core members of relatively large cross section positioned adjacent each other but in slightly spaced apart relation, a pair of magnetizable winding legs of relatively small cross section joining said core members, a permanent magnet for partially saturating said legs, air gap means being provided between said core members for shunting a portion of the flux of said permanent magnet, a pair of load windings positioned respectively on said winding legs in additive relation with the flux produced by said permanent magnet and connected for energization by an alternating potential derived from the output voltage of said generator and having a phase relation corresponding to this voltage, control winding means positioned on said winding legs in flux opposition to said permanent magnet, rectifier means for energizing said control winding means with a pulsating unidirectional current derived from the alternating potential output of said generator, phase shifting means interposed between said generator and said rectifier means, a plurality of rectifier devices connected in circuit with said load windings in a manner such that unidirectional current flows respectively through said load windings during alternate half cycles of said alternating potential, said winding legs saturating respectively during alternate half cycles when the load winding on each is conducting, said control winding means varying the point during each half cycle when each winding leg saturates by varying the degree of pre-saturation of the winding legs whereby the magnitude of the average current through said load windings is controlled, the unidirectional current output of said load windings being utilized to provide excitation for said generator whereby the excitation of said generator is varied to maintain a predetermined alternating voltage output from said generator.

8. A voltage regulating apparatus for an alternating current generator having an excitation field winding, comprising a magnetizable core having a winding leg, a permanent magnet for partially saturating said leg, a load winding on said leg connected for energization by an alternating potential derived from the output voltage of said generator, a control winding positioned on said leg in flux opposition to the flux produced therein by said permanent magnet, rectifier means for energizing said control winding with a pulsating unidirectional current derived from the alternating potential of said generator, a phase shifting network interposed between said generator and said rectifier means, additional rectifier means in circuit with said load winding whereby the current flowing through said load winding is unidirectional, a magnetic amplifier device having load windings in circuit with rectifier means for energization by an alternating potential derived from the output voltage of said generator and first and second control windings, said first control winding of said magnetic amplifier being connected in circuit with said first named load winding, said second control winding being connected for energization by pulsating unidirectional current from said first named rectifier means, and means for connecting said excitation field winding in circuit with the load windings of said magnetic amplifier whereby the excitation of said generator is varied to maintain a predetermined alternating voltage output from said generator.

9. A voltage regulating apparatus for an alternating current generator comprising a magnetizable core having a pair of winding legs, a permanent magnet for partially saturating said legs, said core having a flux path which is magnetically in shunt relation to said winding legs and to said permanent magnet, a pair of load windings positioned respectively on said legs and connected for energization by an alternating potential derived from the output voltage of said generator and having a phase relation corresponding thereto, control winding means positioned on said legs in flux opposition to said permanent magnet, first rectifier means for energizing said control winding means with a pulsating unidirectional current derived from the alternating potential output of said generator, phase shifting means interposed between said generator in said rectifier means, a plurality of rectifier devices connected in circuit with said load windings in a manner such that unidirectional current flows respectively through said load windings during alternate half cycles of said alternating potential, said winding legs saturating respectively during alternate half cycles when the load winding on each is conducting, said control winding means varying the point during each half cycle when each winding leg saturates by varying the degree of presaturation of the winding legs whereby the magnitude of the average current through said load windings is controlled, a self saturating magnetic amplifier having load windings connected in circuit with a plurality of rectifier devices for energization by an alternating potential derived from the output voltage of said generator and first and second control windings, said first control winding being connected for energization in additive flux relation with the load windings of said magnetic amplifier by the current output of said first mentioned load windings, said second control winding being connected for energization in flux opposition to the load windings of said magnetic amplifier by said first rectifier means, the unidirectional output current of the load windings of said magnetic amplifier being connected in circuit with the excitation field windings of said generator whereby the excitation of said generator is varied to maintain a predetermined alternating voltage output from said generator.

10. A voltage regulating apparatus for an alternating current generator provided with at least two output voltage terminals and an excitation field winding, comprising a magnetic regulating and amplifying device having a core member including a magnetizable portion and a permanent magnet portion for partially saturating said magnetizable portion, said magnetizable portion including at least two winding receiving portions, a pair of load windings positioned on said winding receiving portions in additive flux relation with said permanent magnet portion and connected to be energized in parallel with alternating potential proportional to the output voltage of said generator, rectifier means connected in circuit with said load windings in a manner such that unidirectional current flows alternately through the load windings during alternate half cycles of alternating potential, a control winding embracing both of said winding receiving portions, a second stage magnetic amplifier device having a pair of load windings and a pair of control windings on a saturable core and a plurality of rectifier devices in circuit with said load windings, means for energizing the load windings of said second stage magnetic amplifier device in parallel with alternating potential responsive to the output voltage of said generator, said rectifier devices permitting the flow of unidirectional current alternately through said load windings during alternate half cycles of said alternating potential, means for connecting said first control winding of said second stage magnetic amplifier device in circuit with the load windings of said regulating and amplifying device in a manner such that the unidirectional output current of these load windings flows through said first control winding, said current partially saturating the core of said magnetic amplifier device, a full wave rectifier device, means for energizing said full wave rectifier device with alternating potential responsive to the output voltage of said generator, a phase shifting network comprising a resistor connected in series with said full wave rectifier device and a capacitor connected in shunt therewith, circuit means connecting the control winding of said magnetic regulating and amplifying device and the second control winding of said second stage magnetic amplifier device in the output circuit of said full wave rectifier device, and means connecting said field winding in circuit with the load windings of said second stage magnetic amplifier device whereby the unidirectional output current of the load windings of said second stage magnetic amplifier device flows through said field winding.

HUGH M. OGLE.

REFERENCES CITED

The following references are of record in the file of this patent:

UNITED STATES PATENTS

| Number | Name | Date |
|---|---|---|
| 1,788,152 | Dowling | Jan. 6, 1931 |
| 2,339,406 | Holden | Jan. 18, 1944 |
| 2,453,471 | Steinitz | Nov. 9, 1948 |
| 2,464,639 | Fitzgerald | Mar. 15, 1949 |
| 2,525,451 | Graves | Oct. 10, 1950 |